(12) United States Patent
Saito et al.

(10) Patent No.: US 7,384,870 B2
(45) Date of Patent: Jun. 10, 2008

(54) METHOD FOR MANUFACTURING GLASS SUBSTRATE

(75) Inventors: Yasuhiro Saito, Osaka (JP); Kazuishi Mitani, Osaka (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 10/447,750

(22) Filed: May 29, 2003

(65) Prior Publication Data

US 2003/0232173 A1 Dec. 18, 2003

(51) Int. Cl.
*H01L 21/302* (2006.01)
(52) U.S. Cl. .................... 438/692; 438/691; 438/745; 216/97; 134/1.2
(58) Field of Classification Search ............... 438/691, 438/692, 745; 216/31, 97, 98, 108, 109; 134/1.2, 2
See application file for complete search history.

(56) References Cited

U.S. PATENT DOCUMENTS

| | | | |
|---|---|---|---|
| 5,680,285 A * | 10/1997 | Nakamura et al. .......... 360/135 |
| 5,868,953 A | 2/1999 | Maekawa et al. |
| 6,248,143 B1 | 6/2001 | Masuda et al. |
| 6,299,659 B1 | 10/2001 | Kido et al. |
| 6,326,305 B1 * | 12/2001 | Avanzino et al. ........... 438/687 |
| 6,350,692 B1 * | 2/2002 | Economikos et al. ....... 438/692 |
| 6,395,634 B1 * | 5/2002 | Miyamoto ................... 438/691 |
| 6,568,995 B1 | 5/2003 | Mitani et al. |
| 6,576,353 B1 * | 6/2003 | Mitani et al. ......... 428/694 SG |
| 6,582,279 B1 * | 6/2003 | Fox et al. ..................... 451/37 |
| 6,584,989 B2 * | 7/2003 | Taft et al. ................. 134/100.1 |
| 6,810,887 B2 * | 11/2004 | Tan ............................ 134/1.3 |
| 2001/0041657 A1 | 11/2001 | Abe et al. |
| 2002/0157199 A1 * | 10/2002 | Piltingsrud ..................... 15/77 |

FOREIGN PATENT DOCUMENTS

| | | |
|---|---|---|
| JP | 10-198942 | 7/1998 |
| JP | 2002-109727 A | 4/2002 |
| JP | 2002-150547 | 5/2002 |

* cited by examiner

*Primary Examiner*—Lan Vinh
(74) *Attorney, Agent, or Firm*—Akerman Senterfitt

(57) ABSTRACT

A method for providing a high quality glass substrate that if free of residual polishing particles. The method includes polishing the surface of the glass plate with a polishing agent containing cerium oxide particles, washing the glass plate with washing agent containing the three components of acid, a reducing agent, and fluorine ion. The washing agent is provided with an etching effect by the acid, a reducing and decomposing effect by the reducing agent, and a dissolving enhancing effect by the cerium oxide by fluorine ion. The synergistic effect of the three components provides the washing agent with an extremely high ability for washing away cerium oxide and foreign matter from the surface of the glass plate through a small amount of etching such that potential scratches are not produced.

18 Claims, No Drawings

METHOD FOR MANUFACTURING GLASS SUBSTRATE

CROSS-REFERENCES TO RELATED APPLICATIONS

This application is based upon and claims the benefit of priority from prior Japanese Patent Application No. 2002-158844 filed on May 31, 2002, the entire contents of which are incorporated herein by reference.

BACKGROUND OF THE INVENTION

The present invention relates to a method for manufacturing a glass substrate, and more particularly, to a method for manufacturing a glass substrate of an information recording medium, such as a magnetic disk, a magneto-optic disk, or an optical disk, a display apparatus, such as a liquid crystal or an organic EL display, a photomask, and various optical instruments.

In a prior art method for manufacturing a glass substrate, a glass plate having a predetermined shape is prepared. Then, the surface of the glass plate is polished to manufacture a glass substrate, which is flat and free from microscopic scratches. A polishing agent containing cerium oxide is normally used during the polishing. This is because cerium oxide exhibits strong chemical reactions with glass material, and the polishing amount per unit time is high. When using the polishing agent containing cerium oxide, the chemical reaction between the cerium oxide and the glass material may result in residual particles of cerium oxide on the surface of the glass plate. The residual cerium oxide particles on the surface of the glass plate lower the quality of the glass substrate. Therefore, the glass plate is washed after the polishing to remove the cerium oxide particles from the glass plate.

Normally, when washing the glass material, an alkaline aqueous solution, in which a surfactant and/or chelate agent are added, is used as a washing agent. However, in the alkaline aqueous solution, the chemical effect of cerium oxide, which is an inorganic substance, is weak. Thus, the cerium oxide particles cannot be sufficiently removed from the surface of the glass plate. Accordingly, when using the alkaline aqueous solution, the washing time must be extended or the washing temperature must be increased. However, the extension of the washing time and the adjustment of the washing temperature are not simple and decrease productivity.

In addition to the washing with the alkaline aqueous solution, an acidic aqueous solution, such as hydrofluoric acid or hydrosilicofluoric acid, may also be used to perform washing. In this case, the etching effect of the alkaline aqueous solution and acidic aqueous solution slightly dissolves the surface of the glass plate. This removes the residual cerium oxide particles. However, the etching effect roughens the surface of the glass plate and, as a result, decreases the quality of the glass plate. This is because the etching effect may expose small scratches (polishing marks) from the surface of the glass plate or may produce potential scratches.

A mixture of a reducing agent, which functions to decompose cerium oxide, and an acidic aqueous solution may also be used as the washing agent. This produces less potential scratches in comparison to when using only acidic aqueous solution as the washing agent. Further, this dissolves and removes cerium oxide from the surface of the glass plate. However, to remove the cerium oxide embedded in the glass plate, the glass plate must be washed for a long time. This decreases productivity.

The washing may also be performed through a plurality of processes, as described below. This method includes a first washing process using acidic aqueous solution, to which a reducing agent is added, and a second washing process, which uses only acidic aqueous solution, such as hydrofluoric acid or fluorosilicic acid. The cerium oxide on the surface of the glass plate is removed in the first washing process. The cerium oxide embedded in the glass plate is removed through etching in the second washing process. However, potential scratches may be produced in the second washing process.

Since the demand for a high quality glass substrate having a flat and smooth surface must be satisfied, there is a tendency of using an polishing agent with grains having a small diameter and applying a higher polishing pressure. High polishing pressure adheres the cerium oxide particles strongly to the glass plate and further deeply embeds the cerium oxide particles in the glass plate. In such a case, the cerium oxide particles cannot be removed sufficiently, even when using a reducing agent.

SUMMARY OF THE INVENTION

It is an object of the present invention to provide a high quality glass substrate that reduces residual polishing agent.

In one aspect of the present invention, a method for manufacturing a glass substrate is provided. The method includes preparing a glass plate, polishing a surface of the glass plate with a polishing agent containing cerium oxide particles, preparing a washing agent containing acid, a reducing agent, and fluorine ion, and washing the surface of the glass plate with the washing agent.

In a further aspect of the present invention, a method for manufacturing a glass substrate of an information recording medium includes preparing a glass plate having a surface with a corrugation height of 5 μm or less that is measured by a multifunctional disk interferometer with light having a wavelength of 0.4 to 5.0 mm. A surface of the glass plate is polished with a polishing agent containing cerium oxide. The surface of the glass plate is washed with a washing agent containing acid, a reducing agent, and fluorine ion.

In a further aspect of the present invention, a method for manufacturing a glass substrate includes preparing a glass plate, and polishing a surface of the glass plate with polishing slurry containing cerium oxide particles. The polishing slurry is washed away from the glass plate. A washing agent containing 10 wt % of nitric acid, 1.0 wt % of ascorbic acid, and 10 ppm of hydrogen fluoride is prepared. The glass plate is washed with the washing agent to remove the cerium oxide particles from the surface of the glass plate. The glass plate is washed with water, then, is washed with an alkaline aqueous solution.

Other aspects and advantages of the invention will become apparent from the following description illustrating by way of example the principles of the invention.

DETAILED DESCRIPTION OF THE PREFERRED EMBODIMENTS

A glass substrate according to a preferred embodiment of the present invention will now be described.

In the preferred embodiment, the glass substrate is used in the field of electronic information, such as in an information recording medium, a display apparatus, a photomask, and various optical instruments. More specifically, the glass substrate may be applied to, for example, a magnetic disk, a magneto-optic disk, an optical disk, a liquid crystal display, an organic EL display, a photomask, or a glass lens.

The material of the glass substrate is alumino silicate glass, the main components of which are silicon dioxide, aluminum oxide, and alkaline metal oxide; soda lime glass, the main components of which are silicon dioxide and either alkaline metal oxide or alkaline earth metal oxide; borosilicate glass, the main components of which are silicon dioxide and boron oxide; or crystallized glass. Specific examples of the crystallized glass are $Li_2O$—$SiO_2$ glass, the main components of which are lithium oxide and silicon dioxide; $Li_2O$—$Al_2O_3$-$SiO_2$ glass, the main components of which are lithium oxide, silicon dioxide, and aluminum oxide; and $RO$—$Al_2O_3$—$SiO_2$ glass, the main components of which are alkaline earth metal oxide, aluminum oxide, and silicon dioxide. RO represents magnesium oxide (MgO), calcium oxide (CaO), strontium oxide (SrO), barium oxide (BaO), zinc oxide (ZnO), nickel oxide (NiO), and manganese oxide (MnO).

It is preferred that a glass substrate for an information recording medium, especially, for a magnetic disk, use glass material that resists the deposition of metallic salt on its surface. The preferred glass material for an information recording medium is alumino silicate glass having the composition as described below.

| | |
|---|---|
| silicon dioxide ($SiO_2$) | 55 to 70 mol % |
| aluminum dioxide ($Al_2O_3$) | 1.0 to 12.5 mol % |
| lithium oxide ($Li_2O$) | 5 to 20 mol % |
| sodium oxide ($Na_2O$) | 0 to 14 mol % |
| potassium oxide ($K_2O$) | 0 to 3 mol % |
| magnesium oxide (MgO) | 0 to 8 mol % |
| calcium oxide (Cao) | 0 to 10 mol % |
| strontium oxide (SrO) | 0 to 6 mol % |
| barium oxide (BaO) | 0 to 2 mol % |
| titanium dioxide ($TiO_2$) | 0 to 8 mol % |
| zirconium oxide ($ZrO_2$) | 0 to 4 mol % |

It is preferred that the glass substrate have a logistic mean surface roughness Ra, as regulated by JIS B0601-1994, that is 0.7 nm or less. When the logistic mean surface roughness Ra is greater than 0.7 nm, there is a high possibility that there are prominently projecting projections (asperity) in at least part of the surface. Thus, a high quality glass substrate cannot be manufactured. The glass substrate has sufficiently quality when the logistic means roughness Ra is less than or equal to 0.7 nm. However, it is preferred that the logistic means roughness Ra be smaller to further improve quality. It is further preferred that the logistic means roughness Ra be 0.4 nm or less.

Although there may be differences between the applications of the glass substrate, it is preferred that the surface of the substrate have a corrugation height of 0.8 nm or less, more preferably 0.5 nm or less, and further preferably 0.4 nm or less. The corrugation height is measured with a multifunctional interferometer at a wavelength ($\lambda$) of 0.4 to 5.0 mm. The low corrugation height is preferable since the quality of the glass substrate increases as the corrugation height decreases. The glass substrate has poor quality when the corrugation height is high because the glass substrate would be deformed. A glass substrate having less corrugation on its surface is required especially when the glass substrate is used as an information recording medium to increase the recording density.

Normally, a corrugation includes microscopic corrugation. It is preferred that the microscopic corrugation of the glass substrate be 0.3 nm or less, more preferably 0.2 nm or less, and further preferably 0.1 nm or less. The height of the microscopic corrugation is measured with a three-dimensional external structure analysis microscope at a wavelength ($\lambda$) of 0.2 to 1.4 mm. The low microscopic corrugation height is preferable since the quality of the glass substrate increases as the microscopic corrugation height decreases. The glass substrate has poor quality when the microscopic corrugation height is high. A glass substrate having less microscopic corrugation on its surface is required especially when the glass substrate is used as an information recording medium to increase the recording density.

A method for manufacturing the glass substrate will now be described.

A glass sheet is fabricated through a float method, a down drawing method, a redrawing method, or a press method. A glass plate is cut out from the glass sheet in accordance with the desired shape of the glass plate. The glass substrate is, for example, doughnut-shape for a recording medium, rectangular for a display, and circular for lenses of various optical devices. The surface of the glass plate is polished and washed to manufacture the glass substrate.

The polishing step smoothens the surface of the glass plate and removes, for example, deformation of the glass plate, corrugation caused by bending and curving of the glass plate, abrasions, chipping, and cracks. This improves the flatness of the glass substrate. Normally, polishing is performed by a polishing machine. A single type polishing machine, which polishes a glass plate one by one, or a batch type polishing machine, which polishes a plurality of glass plates together, may be employed as the polishing machine.

Mechanical deformation of the polishing machine and polishing stress may produce corrugation in the surface of the glass substrate, microscopic corrugation on the corrugation, and microscopic grooves and ridges, such as polishing marks, when polishing is performed. In this case, it is preferred that polishing be performed in a plurality of stages to remove the microscopic grooves and ridges in accordance with the application of the glass substrate. For example, in a glass substrate for an information recording medium, a head for reading information should be as close as possible to the surface of the information recording medium in order to increase the recording density. However, an error occurs when the head hits a microscopic projection on the surface of the recording medium. To prevent such an error, just flattening the glass plate is insufficient. The surface must be smoothened or extremely smoothened. Therefore, it is preferred that the surface of the substrate be smoothened or extremely smoothened by polishing the surface of the substrate in a stepped manner. If microscopic projections do not have to be removed, the polishing may be performed in just one stage.

A polishing agent is used for the polishing. The polishing agent is, for example, slurry prepared by dispersing particles of cerium oxide into an aqueous solution. When the polishing includes a plurality of stages, in addition to the cerium oxide stage, rare-earth oxides, such as lanthanum oxide, zirconium oxide, manganese dioxide, aluminum oxide, or polishing grains (abrasive grains), such as colloidal silica or alumina, are selectively used.

The corrugation height of the surface of the glass plate is preferably 5 μm or less, more preferably from 0.3 nm to 1 μm, and further preferably from 0.8 to 10 nm prior to the polishing with the polishing agent containing cerium oxide.

As the corrugation height of the glass plate increases, the polishing pressure resulting from the polishing agent containing cerium oxide increases and the polishing takes a long time. As a result, cerium oxide tends to be strongly adhered to the surface of the glass plate strongly. Thus, it becomes difficult to remove the cerium oxide in the subsequent washing process. On the other hand, when the corrugation height of the glass plate is low, the polishing pressure resulting from the polishing agent containing cerium oxide decreases, and polishing is completed within a short period of time. Therefore, cerium oxide is easily removed from the surface of the glass plate. However, lowering the corrugation height of the surface takes a long time. This decreases productivity.

Before polishing with the polishing agent containing cerium oxide, the corrugation height of the microscopic corrugation is preferably 1 µm or less, more preferably from 0.2 nm to 10 nm, and further preferably from 0.2 nm to 0.4 nm. In the same manner as the aforementioned corrugation height, as the microscopic corrugation height of the surface increases, it becomes difficult to remove the cerium oxide residue in the washing process. On the other hand, as the microscopic corrugation height of the surface decreases, it takes a long time to manufacture the glass plate. This decreases the productivity of the glass substrate.

Before polishing with the polishing agent containing the cerium oxide, the logistic mean surface roughness Ra is preferably 1 µm or less, more preferably 0.1 nm to 10 nm, and further preferably 0.3 nm to 1.0 nm. A glass plate having a higher logistic mean surface roughness Ra makes it difficult to remove the cerium oxide in the washing process. A lower logistic mean surface roughness Ra decreases the productivity of the glass substrate.

The washing process of the glass plate subsequent to the polishing is performed using a washing agent to remove foreign matter, such as residual polishing particles, glass particle, and microscopic dust, from the surface. Among the foreign matter, cerium oxide, which includes polishing particles, particularly strongly adheres to the surface of the glass plate or becomes embedded in the glass substrate due to chemical reactions. A washing agent; which contains an acid, a reducing agent, and fluorine ion; is used to balance the effect on the surface of the glass plate resulting from washing with the removal efficiency of the cerium oxide particles.

An acid included in the washing agent provides the washing agent with an etching ability. The etching effect of the washing agent removes the polishing particles, which are adhered to or embedded in the surface of the glass plate, microscopic polishing chips, polishing marks, and decomposed portions of the glass. The acid is included in the washing agent by mixing acidic aqueous solution with the washing agent. An aqueous solution used for precision washing of typical glass products is used as the acidic aqueous solution. To improve the dissolving ability of cerium oxide, strong acidic aqueous solution are preferable, such as nitric acid, sulfuric acid, hydrochloric acid, sulfamic acid, and phosphoric acid. Nitric acid is preferable since it does not cause erosion of stainless steel, which is normally used as the material of a washing tank. Further, nitric acid is preferable since it reacts with the reducing agent in the washing agent and becomes nitrous acid, which has the ability for reducing cerium oxide.

Although the concentration of acid in the washing agent is not particularly limited, the concentration is adjusted in accordance with the acid resistance characteristic of the glass material and the desired degree of washing. It is preferred that the acid concentration of the washing agent have a pH value that is 2 or less to improve the synergistic effect between the reducing agent and the fluorine ion.

The reducing agent provides the washing agent with a reducing ability. The cerium oxide in the washing agent is chemically activated and dissolved by the reducing ability of the washing agent. Thus, the cerium oxide easily dissolves in the washing agent. An agent used for precision washing of typical glass products is used as the reducing agent.

Examples of the reducing agent are hydrogen peroxide, ascorbic acid, sodium boron hydroxide, hydroxylamine sulfate, hydroxylamine hydrochloride, sodium nitrite, sodium sulfite, sodium hydrogensulfite, sodium hydrogensulfate, sodium sulfide, and ammonium sulfide. The above mentioned ascorbic acid, which is useable as the reducing agent, refers to not only ascorbic acid itself (reduced-form) but also dehydroascorbic acid (oxidized-form). Ascorbic acid further refers to structural isomers of both xyloascorbic acid and arabo-ascorbic acid. Ascorbic acid still further refers to optical isomers of both L-isomer and D-isomer. Normally, chemical name ascorbic acid is used to refer to reduced-form ascorbic acids including L-(xylo)-ascorbic acid, which is known as Vitamin C, and D-arabo(D-iso)-ascorbic acid, which is known as erythorbic acid. Dehydroascorbic acid and monodehydroascorbic acid are oxidized-form ascorbic acids with reducing ability. Such oxidized-form ascorbic acids can act as a reducing agent by being oxidized even if they are oxidized-form.

Other examples of the reducing agent are hydrogen, formic acid, oxalic acid, acetaldehyde, hydrogen iodide, sodium hydrogenphosphate, disodium hydrogenphosphate, sodium phosphite, ferrous sulfate, ferric sulfate, cuprous sulfide, and stannous chloride.

Hydrogen peroxide and ascorbic acid are preferable reducing agents since they have superior reducing ability and easily wash away (rinse) the washing agent from the surface of the glass plate. The concentration of the reducing agent in the washing agent is not particularly limited and adjusted in accordance with washing time and washing temperature. It is preferred that the concentration of the reducing agent be 0.01 to 3 percentage by weight to maintain the balance between rinsing with the washing agent easily and sufficient amount of the agent required for dissolving cerium oxide.

Fluorine ion is added to the washing agent by hydrogen fluoride or hydrofluosilicic acid. Chlorine fluoride, such as ammonium fluoride, may be used as long as its amount is such that insoluble material (deposition) is not produced in the washing agent.

A chemical, such as hydrogen fluoride including fluorine ion, is generally used to etch the glass material. In contrast, in the present invention, fluorine ion is added to the washing agent to enhance dissolution of the cerium oxide, which adheres to the glass material, in a catalytic manner. The reasons the washing agent, to which the fluoride ion are added, enhances the dissolution of cerium oxide is presumed as follows. Fluorine ion is adsorbed (coupled) with the cerium oxide or cerium ion, and the chemical coupling between the glass material and cerium oxide is broken on the surface of the glass plate. As a result, it is presumed that the dispersion and dissolution of cerium oxide in the washing agent is enhanced. Accordingly, dissolution is enhanced as long as the concentration of fluorine ion is extremely low in the washing agent so that the washing agent does not have an etching effect.

The synergistic effect of the three components, acid, reducing agent, and fluorine ion, dramatically increases the ability of the washing agent for washing away cerium oxide and enables the removal of foreign matter on the surface of the glass plate with a slight etching, the level of which is such that potential scratches are not produced.

The concentration of the fluorine ion in the washing agent is adjusted to from 1 to 50 ppm in accordance with the acid resistance of the glass material used for the glass plate and the desired washing degree. When the concentration of the fluorine ion is less than 1 ppm, the dissolution of cerium oxide may not be enhanced sufficiently. When the concentration of the fluorine ion is greater than 50 ppm, the etching ability of the washing agent becomes high, and potential scratches may be produced. In a glass substrate for an information recording medium, a texture is formed on the surface of the glass substrate mainly by using a chemical including fluorine ion. Accordingly, if the texture is formed during the washing process, the concentration of the fluorine ion in the washing agent may be higher than 50 ppm.

The washing process is performed in accordance with one of immersion washing method, shower washing method, brush washing method, ultrasonic washing method, and scrub washing method. The immersion method is performed by quietly immersing and placing a glass plate in the washing agent for washing. The shower washing method is performed by spraying the glass plate with the washing agent under a predetermined pressure. The brush washing method is performed by brushing away foreign matter from the surface of the glass plate with a brush. The ultrasonic washing method is performed by radiating ultrasound on the glass plate, which is immersed into the washing agent, using physical force, such as a cavitation effect. The scrub washing method is performed by removing foreign matter by rubbing the glass plate with a scrub pad made of suede, polyvinyl alcohol (PVA), or a foam resin, such as or polyurethane (PU). The ultrasonic washing method and the scrub washing method prevent the surface of the glass plate from being damaged and physically remove foreign matter. This increases the washing degree of the glass plate while maintaining smoothness. Therefore, the ultrasonic washing method and the scrub washing method are particularly preferred among the above methods.

The washing may be divided into a plurality of processes. In this case, in addition to the washing agent that contains the above three components, acidic aqueous solution, alkaline aqueous solution, water, hot water, or organic solution may be selectively used as a washing agent in accordance with the process. An organic alkaline solution, such as tetramethylammonium hydroxide (TMAH), or an inorganic aqueous solution, such as potassium hydroxide, sodium hydroxide, and ammonia, may be used as alkaline aqueous solution. Isopropyl alcohol (IPA), methanol, ethanol, and butanol may be used as the organic solution. A washing aiding agent (builder), which is used to wash typical glass products, may be added to the washing agent as required. The washing building agent is, for example, cationic or anionic surfactant, a buffer agent, a pH adjuster, or a chelate agent.

It is preferred that washing, which uses the washing agent containing the aforementioned three components, be performed in a first process when more than one washing processes are performed. This prevents potential scratches from being produced at an early stage of the washing. After the washing process using the washing agent containing the three components, a water washing (rinsing) process is performed using tap water or pure water. In the rinsing process, the washing agent is washed away from the surface of the glass plate. This prevents the washing agent from affecting the glass plate after the washing. Further, this prevents foreign matter, which is dispersed or dissolved in the washing agent, from adhering to the surface of the glass plate again. The rinsing process is performed by placing the glass plate in water, radiating ultrasound on the glass plate in water, or spraying water on the glass plate.

It is preferred that an alkaline washing process be performed subsequent to the rinse process. This is because the washing agent, which contains the three components, is usually an acidic aqueous solution. Thus, a small electrostatic repulsion force is produced between the glass plate and foreign matter in the acidic aqueous solution. As a result, after washing with the acidic aqueous solution, foreign matter easily adheres to the surface of the glass plate. In contrast, the electrostatic repulsion force between the glass plate and foreign matter increases in the alkaline aqueous solution. Accordingly, foreign matter is easily separated from the glass plate by washing the glass plate with an alkaline aqueous solution.

The preferred embodiment has the advantages described below.

The method for manufacturing a glass substrate of the preferred embodiment includes the processes of polishing the glass plate with a polishing agent containing cerium oxide particles and washing the glass plate with a washing agent, which contains the three components of acid, a reducing agent, and fluorine ion. The washing agent has an etching effect due to the acid, an effect for reducing and decomposing cerium oxide due to the reducing agent, and an effect for enhancing dissolution of the cerium oxide due to the fluorine ion. The synergistic effect of the three components enables the washing agent to have an extremely high ability for washing the cerium oxide. This provides a high quality glass substrate from which foreign matter is removed through a slight amount of etching such that potential scratches are not produced and decreases residual cerium oxide and potential scratches. In this manufacturing method, since the particles of the polishing agent are efficiently removed subsequent to the polishing, the glass substrate is manufactured with high productivity.

Since the concentration of the fluorine ion in the washing agent is from 1 to 50 ppm, the washing agent effectively removes the polishing particles.

Examples and comparative examples of the present embodiment will now be described.

EXAMPLES 1 TO 10

A glass plate having the following composition was prepared.

In examples 1 to 3 and 5 to 10, alumino silicate glass was used. The main composition of the alumino silicate glass was $SiO_2$ 67 mol %, $Al_2O_3$ 10 mol %, $Li_2O$ 7.5 mol %, $Na_2O$ 8.5 mol %, Mgo 3.0 mol %, and CaO 4.0 mol %.

In example 4, soda lime glass was used as the glass material. The main composition of the soda lime glass was $SiO_2$ 72 mol %, $Al_2O_3$ 1.5 mol %, $Na_2O$ 13 mol %, MgO 4 mol %, and CaO 8 mol %.

The surface of the glass plate was polished with the polishing agent (manufactured by SHOWA DENKO, average particle diameter 0.2 μm), which contains cerium oxide, using a suede pad. As much as possible polishing agent was washed away with pure water. Then, the washing process described below was performed on the glass plate.

The washing procedure includes a first washing process, in which the glass plate was washed through the ultrasonic washing method using washing agent (composition shown in table 1) that included the three components, acid, a reducing agent, and fluorine ion. Then, in a second washing process, the glass plate was rinsed with pure water. In a third washing process (alkaline washing process), the glass plate was washed through the ultrasonic washing method with 0.5 wt % of potassium hydroxide aqueous solution. Subsequently, the washing agent was washed away from the surface of the glass plate using pure water. The glass plate was then dried to obtain a sample for examples 1 to 10. In the first and third washing processes, a tabletop ultrasonic cleaner (48 kHz, 100 watts) was used to radiate ultrasound for one minute at 55 degrees Celsius.

Comparative Examples 1 to 7

Aluminosilicate glass was prepared and the surface of the glass was ground as that in the examples 1 to 10. Then, the glass plate was washed in a plurality of processes. In the processes, the ultrasonic washing was performed using the washing agent, the kind and concentration which are shown in table 2. After using the washing agent, the glass plate was rinsed before the following washing. When the washed glass plate was dried, the glass substrate, which was a sample of the comparative examples 1 to 7, was obtained.

Evaluations

The amount of residual cerium oxide on the surface of the glass plate, the etching depth, and the number of potential scratches in examples 1 to 10 and comparative examples 1 to 7 were measured. The amount of residual cerium oxide was measured by determining the number of atoms of cerium oxide through the total reflection fluorescent X-ray measuring method. In the total reflection fluorescent X-ray measurement method, a measuring device TREX 601T manufactured by Technos Co., Ltd. was used. The analysis conditions were as follows.

| Analyzed area | diameter 1 cm |
| --- | --- |
| X-ray infiltration depth | about 50 to 100 nm |
| Target | tungsten |
| Detector | Si (Li) SSD |
| Voltage | 30 kv |
| Current | 100 mA |
| Angle of incidence | 0.05 deg |
| Measurement Time | 500 sec |

The depth of the etching was measured by comparing the thickness of the glass plate immediately after the polishing with the thickness of the glass substrate after the washing.

The number of potential scratches was measured by counting the number of potential scratches through dark field observation at a magnification of 200 times per one field. The results are shown in tables 1 and 2.

As shown in table 1, in examples 1 to 10, the number of atoms of the residual cerium was less than or equal to $1.0 \times 10^{10}$ per 1 $cm^2$, which is less compared to the comparative examples 2 of table 2. Particularly, in examples 1 to 8, the number of atoms of the residual cerium was less than or equal to $0.1 \times 10^{10}$, which are extremely small values.

In examples 1 to 10, the etching depth was less than or equal to 4 nm, and the number of potential scratches was 0 per field in all of the samples. Therefore, the samples of examples 1 to 10 have hardly any residual cerium oxide on the surface of the glass substrate. Further, the amount etched by the washing agent is small. Thus, the glass substrate does not have potential scratches and has high quality.

When comparing examples 1, 9, and 10, the number of atoms of the residual cerium differs depending on the type of reducing agent. The comparison shows that the most preferable reducing agent is ascorbic acid and the next preferable reducing agent is hydrogen peroxide.

In the comparative example 1, in which washing was performed using only alkaline aqueous solution, the amount of etching was very small, and the number of atoms of the residual cerium was $125 \times 10^{10}$ per 1 $cm^2$ and extremely large. This shows that there was a large amount of residual cerium oxide.

In comparative examples 4 and 5, washing was performed in the order of washing agents includes the two components of acid and reducing agent, an alkaline aqueous solution, an acidic aqueous solution, and an alkaline aqueous solution. In this case, although the number of atoms of the residual cerium was smaller than $1.0 \times 10^{10}$ per 1 $cm^2$ indicating that cerium oxide was sufficiently removed, the etching depth was greater than or equal to 7 nm and the number of potential scratches was 17 or more per field. In other words, the increased etching amount sufficiently removed the cerium oxide but produced potential scratches. This indicates that the quality decreased.

In comparative example 6, washing was performed using in the order of acidic aqueous solution and alkaline aqueous solution. In this case, the number of atoms of the residual cerium per 1 $cm^2$, the etching depth, and the number of potential scratches were all high values. This indicates that the glass plate had low quality.

In comparative example 7, washing was performed in the order of reducing agent and alkaline aqueous solution. In this case, the etching depth and the number of potential scratches were satisfactory values. However, the number of atoms of the residual cerium per 1 $cm^2$ was high. This indicates that there was a large amount of residual cerium oxide.

As described above, it is apparent the addition of fluorine ion to the acid and the reducing agent provides the washing agent with a high ability for washing away cerium oxide with a very small etching amount in a manner suppressing the production of potential scratches.

Since the number of remaining cerium atoms per 1 $cm^2$ was smaller than $1.0 \times 10^{10}$, the washing agent was used in two processes in examples 1 to 10. In comparison examples 4 and 5, the washing agent was used in four processes. Accordingly, it is apparent that the number of processes required to wash the glass plate is reduced by using a washing agent containing the three components of acid, reducing agent, and fluorine ion. Thus, the glass plate is manufactured efficiently.

The present embodiment may be modified as described below.

After the polishing or during the polishing, which includes a plurality of processes, the glass plate may undergo chemical reinforcement treatment to improve impact resistance, vibration resistance, and heat resistance. The chemical reinforcement treatment includes exchanging univalent metal ion, such as lithium ions and sodium ions, that are included in the composition of the glass substrate with univalent metal ion, such as sodium ions and potassium ions, which has a greater ion radius than that of the above metal ion. The ion exchange causes compression stress on the surface of the glass substrate and the glass substrate is reinforced. In the chemical reinforcement, the glass plate is immersed in the chemical reinforcement liquid, which is made by heating and dissolving chemical reinforcement salt, for a predetermined time. In a specific example of the chemical reinforcement salt, nitric acid potassium, nitric sodium, and nitric silver may be used solely or by mixing at least two of these substances. It is preferred that the temperature of the chemical reinforcement liquid be about 50 to 150 degrees Celsius below the distortion point of the glass material, which is used in the glass substrate. It is further preferred that the temperature of the chemical reinforcement liquid be about 350 to 400 degrees Celsius. The chemical reinforcement is not performed when the temperature of the material of the glass substrate is about 50 degree Celsius below the distortion point. If the temperature of the glass substrate is about 50 degree Celsius below the distortion point of the glass material of the glass substrate, the glass substrate could be distorted when chemically reinforcing the glass substrate.

The present examples and embodiments are to be considered as illustrative and not restrictive, and the invention is not to be limited to the details given herein, but may be modified within the scope and equivalence of the appended claims.

preparing a soda lime glass plate or an alumino silicate glass plate;

polishing a surface of the glass plate with a polishing agent containing cerium oxide particles;

preparing a washing agent containing acid, a reducing agent, and fluorine ion, wherein the concentration of the fluorine ion in the washing agent is adjusted to 1 to 50 ppm; and after said polishing, washing the surface of the glass plate with the washing agent to remove the cerium oxide adhered to said surface.

2. The method according to claim 1, wherein the acid is nitric acid, and the preparing step includes adjusting the pH value of the washing agent to two or less by adding nitric acid.

3. The method according to claim 1, wherein the reducing agent is ascorbic acid or hydrogen peroxide.

4. The method according to claim 1, wherein the acid is at least one acid selected from the group consisting of nitric acid, sulfuric acid, hydrochloric acid, sulfamic acid, and phosphoric acid.

TABLE 1

| | Washing agent in first process | | | | | | Evaluation | | |
|---|---|---|---|---|---|---|---|---|---|
| | Acid | | Reducing Agent | | Hydrofluoric Acid | Washing agent in second process | | Remaining amount | Etched | Number of potential |
| Ex. | Compound | Conc. (wt %) | Compound | Conc. (wt %) | Conc. (ppm) | Compound | Conc. (wt %) | ($\times 10^{10}$ atoms) | Depth (nm) | scratches per field |
| 1 | $H_2SO_4$ | 1.0 | ascorbic acid | 1.0 | 10 | KOH | 0.5 | 0.01 or less | 3 | 0 |
| 2 | $H_2SO_4$ | 1.0 | ascorbic acid | 1.0 | 50 | KOH | 0.5 | 0.01 or less | 4 | 0 |
| 3 | $H_2SO_4$ | 0.1 | ascorbic acid | 1.0 | 10 | KOH | 0.5 | 0.01 or less | 3 | 0 |
| 4 | $H_2SO_4$ | 1.0 | ascorbic acid | 1.0 | 50 | KOH | 0.5 | 0.01 or less | 0.5 | 0 |
| 5 | $H_3PO_4$ | 1.0 | ascorbic acid | 1.0 | 10 | KOH | 0.5 | 0.01 or less | 4 | 0 |
| 6 | $HNO_3$ | 1.0 | ascorbic acid | 1.0 | 10 | KOH | 0.5 | 0.01 or less | 4 | 0 |
| 7 | HCl | 1.0 | ascorbic acid | 1.0 | 10 | KOH | 0.5 | 0.01 or less | 4 | 0 |
| 8 | SulfamicAcid | 1.0 | ascorbic acid | 1.0 | 10 | KOH | 0.5 | 0.01 or less | 4 | 0 |
| 9 | $H_2SO_4$ | 1.0 | $H_2O_2$ | 3.0 | 10 | KOH | 0.5 | 0.34 | 4 | 0 |
| 10 | $H_2SO_4$ | 1.0 | $NaNO_2$ | 0.1 | 10 | KOH | 0.5 | 0.09 | 4 | 0 |

TABLE 2

| | | | | | | | | | Evaluation | | |
|---|---|---|---|---|---|---|---|---|---|---|---|
| | First washing agent | | Second washing agent | | Third washing agent | | Fourth washing agent | | Remaining amount | Etched | Number of potential |
| Comp. Ex. | Compound | Conc. | Compound | Conc. | Compound | Conc. | Compound | Conc. | ($\times 10^{10}$ atoms) | Depth (nm) | scratches per field |
| 1 | KOH | 1 wt % | — | — | — | — | — | — | 125 | 0.5 | 0 |
| 2 | $H_2SO_4$ ascorbic acid | 1 wt % | KOH | 0.5 wt % | — | — | — | — | 7.5 | 3 | 0 |
| 3 | $H_2SO_4$ ascorbic acid | 1 wt % | KOH | 1 wt % | — | — | — | — | 5.3 | 3.5 | 0 |
| 4 | $H_2SO_4$ ascorbic acid | 1 wt % | KOH | 1 wt % | hydrofluoric acid | 100 ppm | KOH | 1 wt % | 0.8 | 7 | 17 |
| 5 | $H_2SO_4$ ascorbic acid | 1 wt % | KOH | 1 wt % | hydrofluoric acid | 200 ppm | KOH | 1 wt % | 0.1 | 10 | 35 |
| 6 | hydrofluoric acid | 500 ppm | KOH | 1 wt % | — | — | — | — | 1.54 | 16 | 50 or more |
| 7 | ascorbic acid | 1 wt % | KOH | 1 wt % | — | — | — | — | 25 | 3.5 | 0 |

What is claimed is:

1. A method for manufacturing a soda lime glass substrate or an alumino silicate glass substrate of an information recording medium, comprising the steps of:

5. The method according to claim 1, wherein said preparing a washing agent includes using said fluorine ion for enhancing dissolution of the cerium oxide, which adheres to the glass plate.

6. The method according to claim 1, further comprising the step of rinsing the washing agent from the surface of the glass plate subsequent to the washing step.

7. The method according to claim 6, wherein the washing agent is acidic aqueous solution, the method further comprising the step of washing the surface of the glass plate using alkaline aqueous solution subsequent to the rinsing step.

8. The method according to claim 1, wherein said washing the surface of the glass plate includes lowering the number of cerium atoms remaining on the surface of the glass plate equal to or less than $1.0 \times 10^{10}$ per 1 $cm^2$.

9. The method according to claim 8, wherein said washing the surface of the glass plate causes an etching depth of less than or equal to 4 nm.

10. A method for manufacturing a soda lime glass substrate or an alumino silicate glass substrate of an information recording medium, the method comprising the steps of:
   preparing a soda lime glass plate or an alumino silicate glass plate having a surface with a corrugation height of 5 μm or less that is measured by a multifunctional disk interferometer with light having a wavelength of 0.4 to 5.0 mm;
   polishing a surface of the glass plate with a polishing agent containing cerium oxide; and
   after said polishing, washing the surface of the glass plate with a washing agent containing acid, a reducing agent, and fluorine ion to remove the cerium oxide adhered to said surfaces, wherein the concentration of the fluorine ion in the washing agent is adjusted to 1 to 50 ppm.

11. The method according to claim 10, wherein the step of preparing the glass plate includes preparing a glass plate with a surface having a microscopic corrugation height of 1 μm or less that is measured by a three-dimensional surface structure analysis microscope with light having a wavelength of 0.2 to 1.4 mm.

12. The method according to claim 10, wherein the step of preparing the glass plate includes preparing a glass plate having a surface with a logistic mean roughness Ra of 1 μm or less.

13. The method according to claim 10, wherein the acid is at least one acid selected from the group consisting of nitric acid, sulfuric acid, hydrochloric acid, sulfamic acid, and phosphoric acid.

14. The method according to claim 10, wherein the reducing agent is ascorbic acid.

15. The method according to claim 10, wherein said washing the surface of the glass plate includes lowering the number of cerium atoms remaining on the surface of the glass plate equal to or less than $1.0 \times 10^{10}$ per 1 $cm^2$.

16. The method according to claim 15, wherein said washing the surface of the glass plate causes an etching depth of less than or equal to 4 nm.

17. The method according to claim 10, wherein said preparing a washing agent includes using said fluorine ion for enhancing dissolution of the cerium oxide, which adheres to the glass plate.

18. A method for manufacturing a glass substrate, the method comprising the steps of:
   preparing a glass plate;
   polishing the surface of the glass plate wit polishing slurry containing cerium oxide particles;
   washing away the polishing slurry from the glass plate;
   preparing a washing agent containing 10 wt % of nitric acid, 1.0 wt % of ascorbic acid, and 10 ppm of hydrogen fluoride;
   washing the glass plate with the washing agent and removing the cerium oxide particles from the surface of the glass plate;
   washing the glass plate with water; and
   washing the glass plate with an alkaline aqueous solution.

* * * * *